US010809916B2

(12) United States Patent
Amirishetty et al.

(10) Patent No.: US 10,809,916 B2
(45) Date of Patent: Oct. 20, 2020

(54) INSTANCE RECOVERY USING BLOOM FILTERS

(71) Applicant: Oracle International Corporation, Redwood Shores, CA (US)

(72) Inventors: Anjan Kumar Amirishetty, Fremont, CA (US); Yunrui Li, Fremont, CA (US); Tolga Yurek, Foster City, CA (US); Wilson Wai Shun Chan, San Mateo, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 348 days.

(21) Appl. No.: 15/489,482

(22) Filed: Apr. 17, 2017

(65) Prior Publication Data

US 2018/0300204 A1 Oct. 18, 2018

(51) Int. Cl.
*G06F 3/00* (2006.01)
*G06F 3/06* (2006.01)
*G06F 16/21* (2019.01)
*G06F 11/14* (2006.01)
*G06F 11/20* (2006.01)

(52) U.S. Cl.
CPC ............ *G06F 3/06* (2013.01); *G06F 11/1471* (2013.01); *G06F 11/2094* (2013.01); *G06F 16/21* (2019.01); *G06F 11/1451* (2013.01); *G06F 2201/80* (2013.01)

(58) Field of Classification Search
CPC ............ G06F 11/1451; G06F 11/1469; G06F 2201/84; G06F 11/14; G06F 11/1662; G06F 16/27; G06F 11/1458; G06F 11/1461; G06F 11/1658
See application file for complete search history.

(56) References Cited

U.S. PATENT DOCUMENTS 5,485,608 A * 1/1996 Lomet ................. G06F 11/1471
7,702,660 B2 4/2010 Chan et al.
(Continued)

FOREIGN PATENT DOCUMENTS

KR 101714932 B1 * 3/2017

OTHER PUBLICATIONS

Wikipedia.com, "Bloom Filter", https://en.wikipedia.org/wiki/Bloom_filter, last viewed on Jun. 12, 2017, 15 pages.

*Primary Examiner* — Augustine K. Obisesan
(74) *Attorney, Agent, or Firm* — Hickman Palermo Becker Bingham LLP

(57) ABSTRACT

Techniques related to instance recovery using Bloom filters are disclosed. A multi-node node database management system (DBMS) includes a first database server instance and a second database server instance. A recovery set includes a set of data blocks that have been modified by a first database server instance and not persisted. A Bloom filter is generated to indicate whether data blocks are excluded from the recovery set. The Bloom filter is sent to the second database server instance, which determines whether the Bloom filter indicates that a particular data block is excluded from the recovery set. Based on determining that the Bloom filter indicates that the particular data block is excluded from the recovery set, access to the particular data block is granted.

20 Claims, 7 Drawing Sheets

(56) References Cited

U.S. PATENT DOCUMENTS

| | | | |
|---|---|---|---|
| 8,954,409 B1* | 2/2015 | Kerem | G06F 16/9014 |
| | | | 707/704 |
| 2004/0205066 A1* | 10/2004 | Bhattacharjee | G06F 16/2343 |
| 2008/0147714 A1* | 6/2008 | Breternitz | G06F 12/0864 |
| 2014/0279840 A1* | 9/2014 | Chan | G06F 16/22 |
| | | | 707/607 |
| 2016/0085631 A1* | 3/2016 | Madiraju Varadaraju | |
| | | | G06F 11/1451 |
| | | | 707/653 |
| 2017/0199921 A1* | 7/2017 | Khanlarov | G06Q 30/01 |
| 2017/0344435 A1* | 11/2017 | Davis | G06F 11/1464 |

* cited by examiner

INSTANCE RECOVERY USING BLOOM FILTERS

TECHNICAL FIELD

Embodiments relate to database systems and, more specifically, to instance recovery using Bloom filters.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Multi-Node DBMS

In the context of a multi-node database management system (DBMS), a "node" refers to a computing element comprising one or more hardware processors that share access to the same main memory. A multi-node DBMS runs on multiple computing nodes to offer a number of advantages over a database system that runs on a single computing node. In particular, a multi-node DBMS offers high availability even when a node suffers from a hardware failure. More specifically, in the event of a node failure, a surviving node may continue to host a DBMS.

For example, FIG. 1 depicts DBMS 106, which runs on nodes 100-104. If node 100 fails, node 102 and/or node 104 may continue to host DBMS 106. If nodes 100 and 102 fail, node 104 may continue to host DBMS 106. Although depicted in FIG. 1 as running on three nodes, a multi-node DBMS may run on two or more nodes.

Each node may host one or more database server instances or "instances" for short. For example, FIG. 1 depicts instances 108-112 running on nodes 100-104, respectively. Each instance is an allocation of processes and memory that are used to govern and facilitate access to a database, which may be maintained, at least in part, in a shared storage. Referring to FIG. 1, instances 108-112 include a number of processes (not shown) and volatile memory 114-118, respectively. Instances 108-112 share access to persistent storage 130, which maintains a database including data files 138. Persistent storage 130 may include one or more magnetic disks and/or some other form of non-volatile memory that is capable of retaining data without any power.

Database data is typically stored persistently as "data blocks". For example, data blocks 120-126 may each be a copy of two kilobytes of data stored in data files 138. Data blocks may be cached in memory to enable modifying some or all of the data blocks.

Although distributed across a cluster of nodes, instances collectively implement server-side functions of a DBMS to appear as a single unified database application. Thus, a multi-node DBMS also offers high availability even when an instance suffers from a software failure. In the event of an instance failure due to a software failure and/or a node failure (collectively referred to herein as an "instance failure"), a surviving instance may continue to provide database services. For example, if instance 108 fails, instance 110 and/or instance 112 may continue to provide database services. If instances 108 and 110 fail, instance 112 may continue to provide database services.

However, instance failures introduce data consistency issues. Referring to FIG. 1, data files 138 maintained on persistent storage 130 survive any instance failure, but dirty versions of data blocks 120-126 stored in cache are lost if instance 108 fails. This is problematic if instance 108 modified data blocks 120-126, but modified versions of data blocks 120-126 were not persistently stored prior to instance 108 failing.

Instance Recovery

To resolve data consistency issues, a process known as "instance recovery" is performed to restore a database to a state that existed immediately prior to an instance failure. Instance recovery is performed, at least in part, by a surviving instance in the multi-node DBMS. In particular, instance recovery involves a surviving instance reconstructing data block changes that were lost during an instance failure. However, database modifications are typically made in an atomic fashion using "transactions". A transaction may include one or more instructions that are processed as a single logical operation. If a transaction is "committed", any changes made by the transaction are made permanent. On the other hand, if a transaction is not committed, any changes made by the transaction are effectively "undone" based on restoring one or more data blocks to a pre-modification state. To accurately restore a database to a pre-failure state, instance recovery distinguishes between committed and uncommitted transactions.

Typically, instance recovery is performed in two stages—a "cache recovery" stage and a "transaction recovery" stage. In the cache recovery stage, a surviving instance replicates, in cache, data blocks that may be dirty at the time of failure. Dirty data blocks are data blocks that have been changed in cache but have not been written back to persistent storage. In the transaction recovery stage, any uncommitted changes to data blocks are undone.

Cache recovery is based on "redo records". Through a process referred to as write-ahead logging, prior to making a modification to a data block in the cache, an instance generates a redo record that specifies the modification to be made. The redo record is stored persistently before the modification is made to the data block. Redo records for changes to data blocks may be applied to previous versions of the data blocks to "recover" the changes. For example, FIG. 1 depicts redo logs 132-136 that correspond to instances 108-112, respectively. Instance recovery involves accessing a redo log of a failed instance. When instance 108 fails, its cache may be "recovered" based on instance 110 and/or instance 112 accessing redo log 132 to determine what changes were made to which data blocks.

The cache recovery stage can include three phases: a "scan" phase, a "claim" phase, and an "apply" phase. In the scan phase, redo records are searched to identify a set of data blocks that may be dirty. In the claim phase, the set of data blocks are locked to prevent access until instance recovery is complete. In the apply phase, the set of data blocks are modified according to the redo records. Each phase is described in greater detail below.

Cache Recovery Phases

During the scan phase, a set of redo records is processed to determine a "recovery set". As used herein, a recovery set refers to a set of data blocks that are dirty. Referring to FIG. 2, redo records 200-208 include data block identifiers 210-218, respectively. However, recovery set 234 corresponds to data block identifiers 214-218, which identify data blocks 120-124, respectively. Thus, recovery set 234 includes data blocks 120-124, and a representation of recovery set 234 includes data block identifiers 214-218.

Typically, the scan phase involves determining a recovery set by scanning a redo log from a point beginning with a checkpoint. Checkpoints are created through an operation referred to herein as checkpointing. Under checkpointing, dirty data blocks are written to persistent storage, and a checkpoint record representing a checkpoint is written to the redo log. Checkpoint 230 represents a checkpoint. For any redo record before the latest checkpoint, a data block with the changes recorded by the redo record has been written to persistent storage and is no longer dirty (at least with respect to any changes for any redo record preceding the checkpoint record). Referring to FIG. 2, redo records 200-202 correspond to data blocks that have undergone checkpointing. For any redo records occurring after the checkpoint, the corresponding changed data block may or may not have been written to persistent storage. Referring to FIG. 2, redo records 204-208 may correspond to dirty data blocks.

During the claim phase, a surviving instance acquires locks on the data blocks included in the recovery set. Furthermore, the surviving instance stores copies of the data blocks in a portion of its memory that is allocated for instance recovery. For example, instance 110 may cache data blocks 120-124 in volatile memory 116.

During the apply phase, redo records after the latest check point are applied to the data blocks in the recovery set. Referring to FIG. 2, redo records 200-208 include modifications 220-228, respectively. However, based on the results of the scan phase, the surviving instance may scan from checkpoint 230 to end of records 232 for modifications 224-228. Thereafter, the surviving instance may apply the set of modifications to the data blocks of the recovery set in memory.

The entire database is typically unavailable during the scan phase and the claim phase. This period of unavailability is referred to herein as a "brown-out". Until the end of the brown out, which ends with the end of the claim phase, other surviving instances are unable to determine which data blocks are included in the recovery set. Thus, the entire database is made inaccessible to all instances for the duration of the brown-out. When the claim phase ends, locks have been acquired on the recovery set. Data blocks not in the recovery set are not locked and may be accessed. Accordingly, what is needed is an approach for minimizing brown-out during instance recovery.

Figure 1:
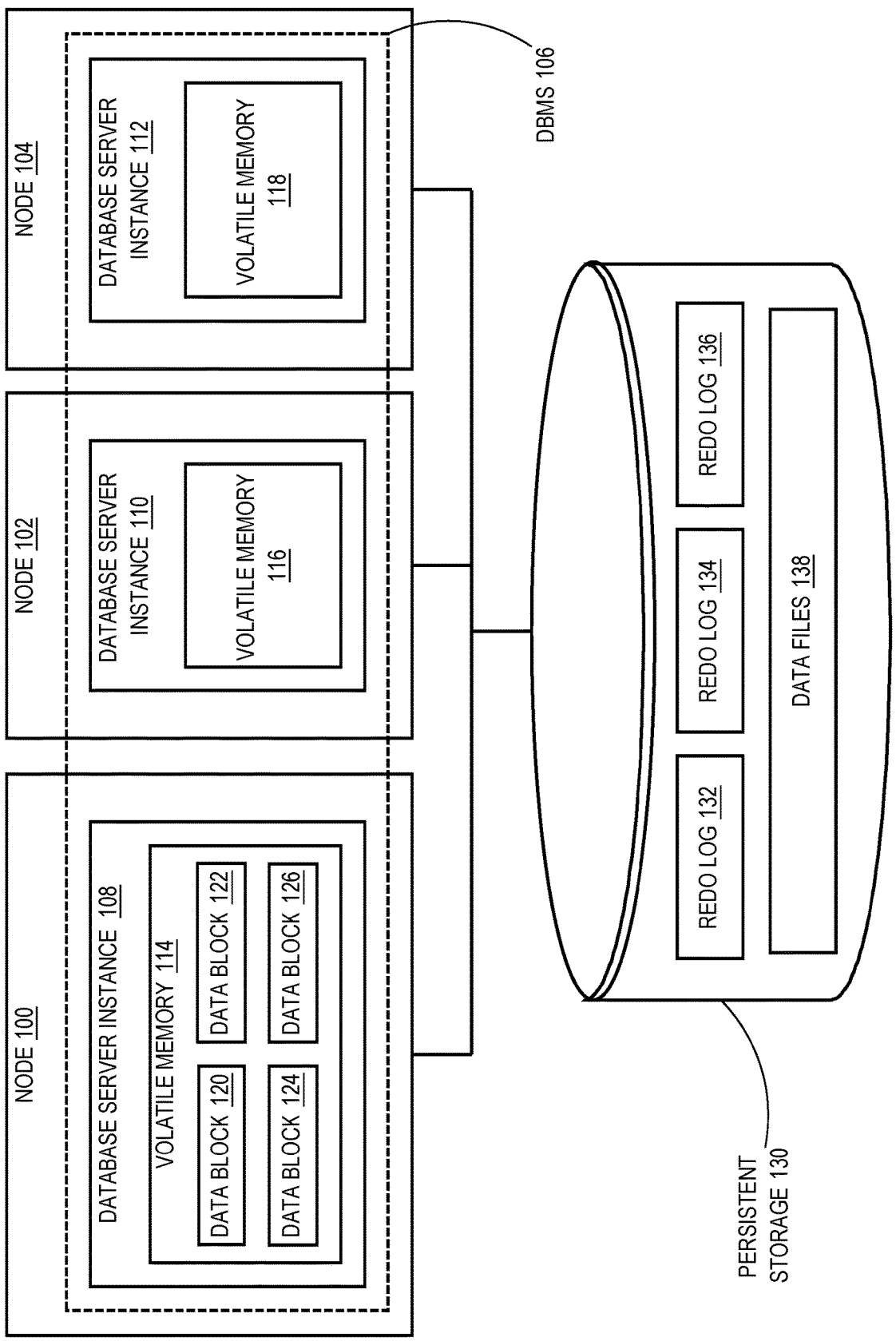
FIG. 1 depicts an example computer architecture on which embodiments may be implemented.
Figure 2:
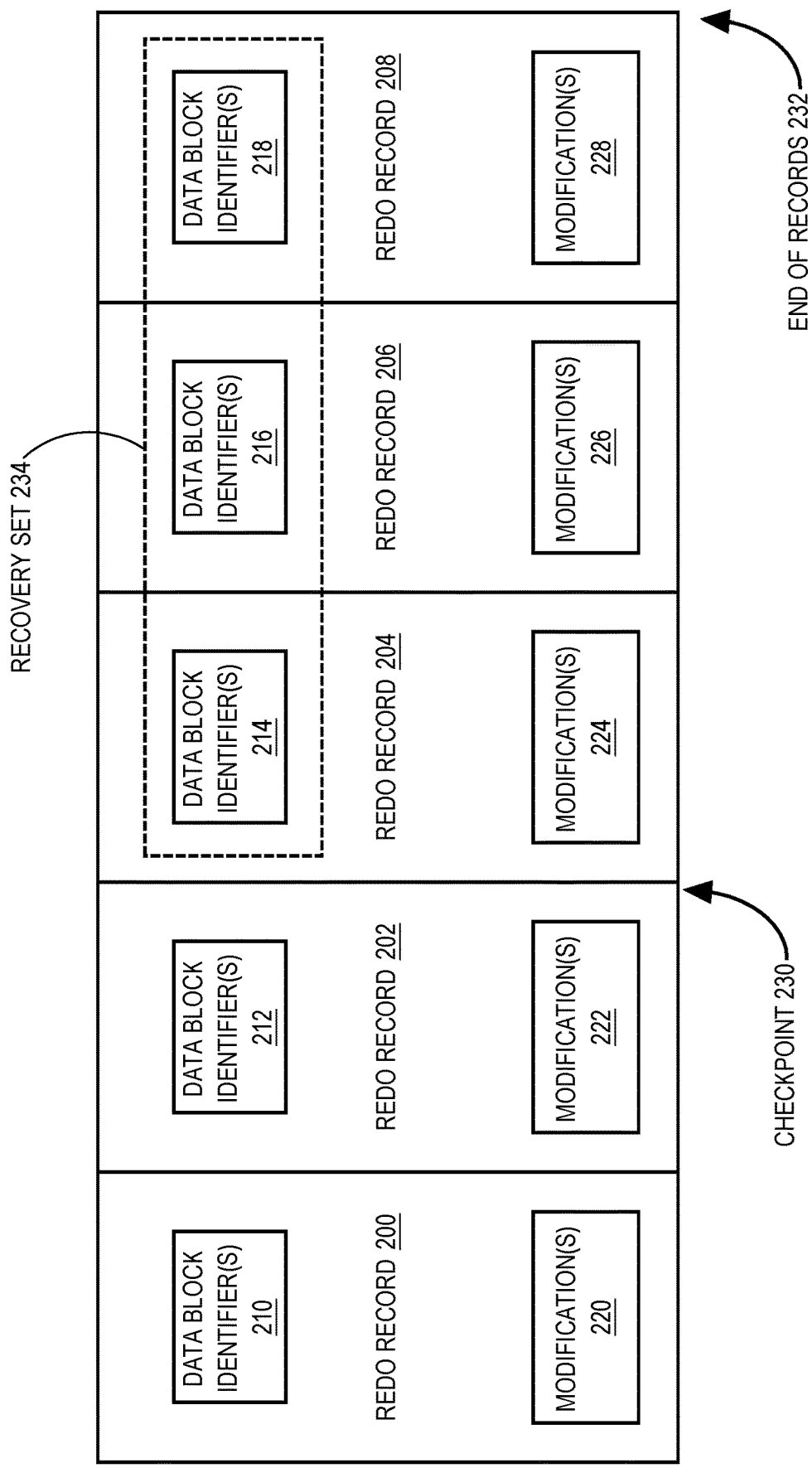
FIG. 2 depicts an example set of redo records.

While each of the drawing figures depicts a particular embodiment for purposes of depicting a clear example, other embodiments may omit, add to, reorder, and/or modify any of the elements shown in the drawing figures. For purposes of depicting clear examples, one or more figures may be described with reference to one or more other figures, but using the particular arrangement depicted in the one or more other figures is not required in other embodiments.

DETAILED DESCRIPTION

In the following description, for the purposes of explanation, numerous specific details are set forth in order to provide a thorough understanding of the present disclosure. It will be apparent, however, that the present disclosure may be practiced without these specific details. Modifiers such as "first" and "second" may be used to differentiate elements, but the modifiers do not necessarily indicate any particular order.

INTRODUCTION

A brown-out can be minimized based on generating a Bloom filter that indicates whether a particular data block is excluded from a recovery set. The Bloom filter may be broadcasted such that each surviving instance has a copy of the Bloom filter. Each surviving instance may use the Bloom filter to grant or deny lock requests in a distributed fashion. If a surviving instance receives a lock request for a data block that is excluded from the recovery set, the lock request is granted. On the other hand, if a surviving instance receives a lock request for a data block that is not excluded from the recovery set, the lock request is denied.

Advantageously, the Bloom filter enables a database to become available even before the end of the claim phase, because locking the recovery set is no longer necessary to make the database available. Instead, the Bloom filter is used to notify each surviving instance which data blocks can be safely accessed.

Other data structures, such as a hash table, may be used to identify member data blocks of a recovery set. However, broadcasting such data structures may require marshaling/unmarshalling to convert the data structure to a form that may be sent and received over a network. Notably, transmitting the Bloom filter does not incur such computational overhead, because the Bloom filter does not require marshalling/unmarshalling before/after transmission.

In some embodiments, the Bloom filter is generated prior to an instance failure. In such embodiments, the database could become available almost immediately after an instance failure.

Bloom Filters

A Bloom filter is a probabilistic data structure that indicates whether it is possible for a particular item to be included in a particular set. In other words, a Bloom filter may provide false positives, because there is some uncertainty as to whether the particular item is included in the particular set. On the other hand, a Bloom filter indicates, with absolute certainty, that a particular item is excluded from the particular set. In other words, a Bloom filter never provides false negatives.

Figure 3:
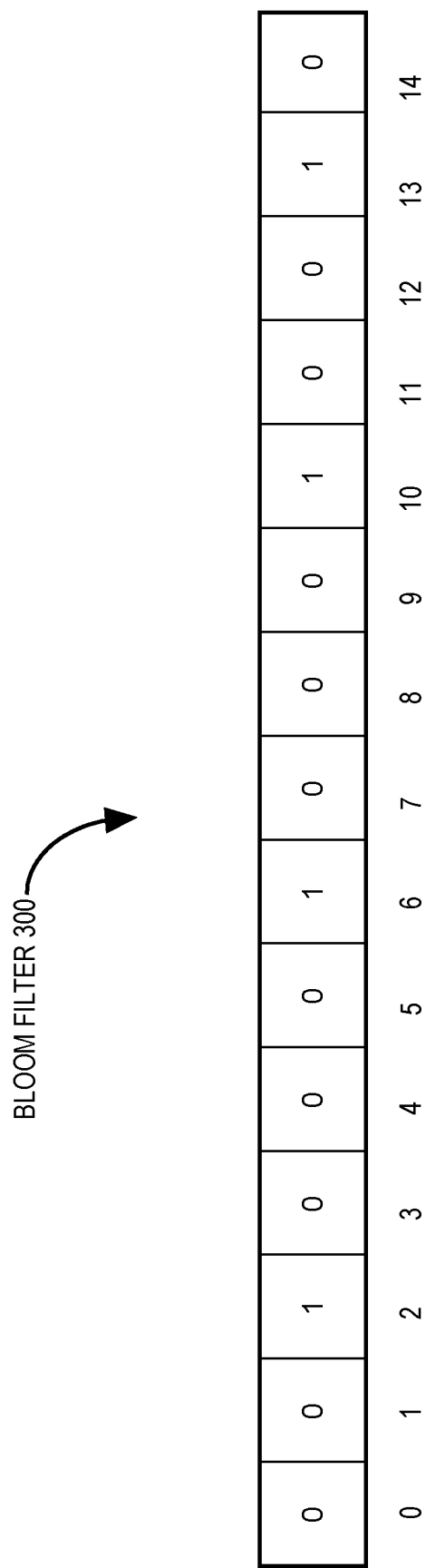
FIG. 3 depicts an example Bloom filter.

Referring to FIG. 3, for example, the set bits of Bloom filter 300 indicate that a particular item corresponding to indices "2", "6", "10", and/or "13" could be included in a particular set represented by Bloom filter 300. In contrast, the unset bits of Bloom filter 300 indicate that it is impossible for a particular item corresponding to any other indices to be included in the particular set.

Elements are related to indices based on one or more hash functions. A hash function takes an item identifier as input and provides a corresponding index as output. Using more hash functions has the benefit of fewer false positives. However, it also has the drawbacks of filling up a Bloom filter more quickly and making it slower to use the Bloom filter. Typically, two hash functions are used.

For example, Bloom filter 300 may be generated using two hash functions—hash function A and hash function B. The two hash functions may be used to "add" a particular item to Bloom filter 300 based on providing the indices where bits should be set. In other words, adding a particular item to a Bloom filter involves setting a bit at each index corresponding to the particular item. To illustrate, hash function A may take the item "120" and output the index "2", and hash function B may take the same item and output the index "13". The bits of Bloom filter 300 corresponding to indices "2" and "13" are then set.

The one or more hash functions are also used to test for set membership. However, false positives may result from hash collisions. For example, hash function A may take the item "401" and output the index "13", and hash function B may take the same item and output the index "2". Since Bloom filter 300 has bits set at indices "2" and "13", Bloom filter 300 would indicate that it is possible for the item "401" to have been added to it. However, the set bits at indices "2" and "13" may actually indicate that the item "120", not the item "401", has been added to Bloom filter 300.

Accordingly, it is more useful to use the one or more hash functions to test for items that have not been added to a Bloom filter. For example, hash function A may take the item "122" and output the index "0", and hash function B may take the same item and output the index "9". Since Bloom filter 300 has unset bits at indices "0" and "9", Bloom filter 300 would indicate that it is impossible for the item "122" to have been added to it.

As used herein, a Bloom filter is used as an additional representation of a recovery set. Adding data blocks to the Bloom filter involves hashing data block identifiers to determine which indices of the Bloom filter should have bits set. For example, hash function A may take a file number and a block number of a particular data block and output the index "2", and hash function B may take the file number and the block number and output the index "13". Thus, the bits at indices "2" and "13" would be set to indicate that the particular data block is included in the recovery set.

For the avoidance of doubt, it is reiterated that the Bloom filter does not replace the list, hash table, and/or the like that is used to acquire locks on the recovery set during the claim phase. This is because the Bloom filter cannot definitively indicate which data blocks are included in the recovery set. Rather, the Bloom filter definitively indicates which data blocks are excluded from the recovery set. Thus, generating the Bloom filter may be performed concurrently with generating another representation of the recovery set during the scan phase.

Advantageously, an instance that generates the Bloom filter can distribute the Bloom filter to other instances without significantly affecting performance. This is because a Bloom filter may be implemented as a bit array, a bit vector, a bit stream, and/or the like. Thus, it can be transmitted without performing any marshalling/unmarshalling. Instead, adding elements and testing for membership involve hashing, which has a time complexity of O(k), where k represents the number of hash functions involved. Thus, each recipient instance can use the Bloom filter to quickly determine which data blocks are definitely excluded from the recovery set and, therefore, can be safely accessed. Notably, these parts of the database become available to client requests without acquiring locks on the recovery set.

In some embodiments, the Bloom filter has a size that is automatically determined. The size may be determined based on an amount of memory that is allocated for instance recovery. The amount of memory may be measured in terms of a number of data blocks that it can accommodate. Additionally or alternatively, the amount of memory may correspond to a number of data blocks that were identified during the scan phase. Additionally or alternatively, the amount of memory may correspond to a number of data blocks that were involved in a previous instance recovery.

For example, during the scan phase, instance 110 may allocate sufficient space in volatile memory 116 to fit data blocks 120-124. Accordingly, during the scan phase, instance 110 may also allocate sufficient space in volatile memory 116 to fit a Bloom filter having a size that is based on a multiple of three, which is the number of data blocks 120-124.

In some embodiments, the Bloom filter has a size that is determined based on user input. The user input may specify a desired size and/or a desired false positive rate. A smaller false positive rate translates into a larger Bloom filter, and a larger false positive rate translates into a smaller Bloom filter.

Bloom Filter Generation Prior to Instance Failure

In some embodiments, the scan phase may be performed prior to an instance failure. This may involve assigning a "buddy instance" to each instance. Buddy instances are described in U.S. Pat. No. 7,702,660, entitled I/O free Recovery Set Determination, filed on Dec. 12, 2012 by Wilson Chan, et al., and issued Apr. 20, 2010, the entire contents of which are incorporated herein by reference. Each buddy instance generates a Bloom filter for another instance that has not failed so that if a particular instance fails, its Bloom filter will be ready for distribution to surviving instances.

For example, instance 110 may generate Bloom filter A for instance 108, instance 112 may generate Bloom filter B for instance 110, and instance 108 may generate Bloom filter C for instance 112. Thus, if instance 108 fails, instance 110 may simply transmit Bloom filter A to instance 112 and proceed to the claim phase. For instance 110, the database is immediately available for client requests that it receives, because it already possessed Bloom filter A. For instance 112, upon receiving Bloom filter A, the database is available for client requests that it receives.

Prior to an instance failure, however, a checkpoint position of a redo log may advance after a Bloom filter has been generated. Thus, the composition of a corresponding recovery set may change. For example, a particular data block may need to be added to or removed from the recovery set. Although data blocks can easily be added to a Bloom filter, it is difficult to "remove" a particular data block from a Bloom filter. This is because removing a data block from a Bloom filter would involve unsetting bits that could correspond to another data block. For example, data blocks "120" and "401" may both be included in a recovery set. However, data blocks "120" and "401" may both correspond to indices "2" and "13" of a Bloom filter. Thus, it may be impossible to remove data block "120" from the Bloom filter without also removing data block "401" from the Bloom filter.

Accordingly, a new Bloom filter may be generated when a checkpoint position of a redo log advances. Generating the new Bloom filter may involve clearing the bits of an old Bloom filter and adding data blocks of a new recovery set as they are scanned.

Process Overview

Figure 4:
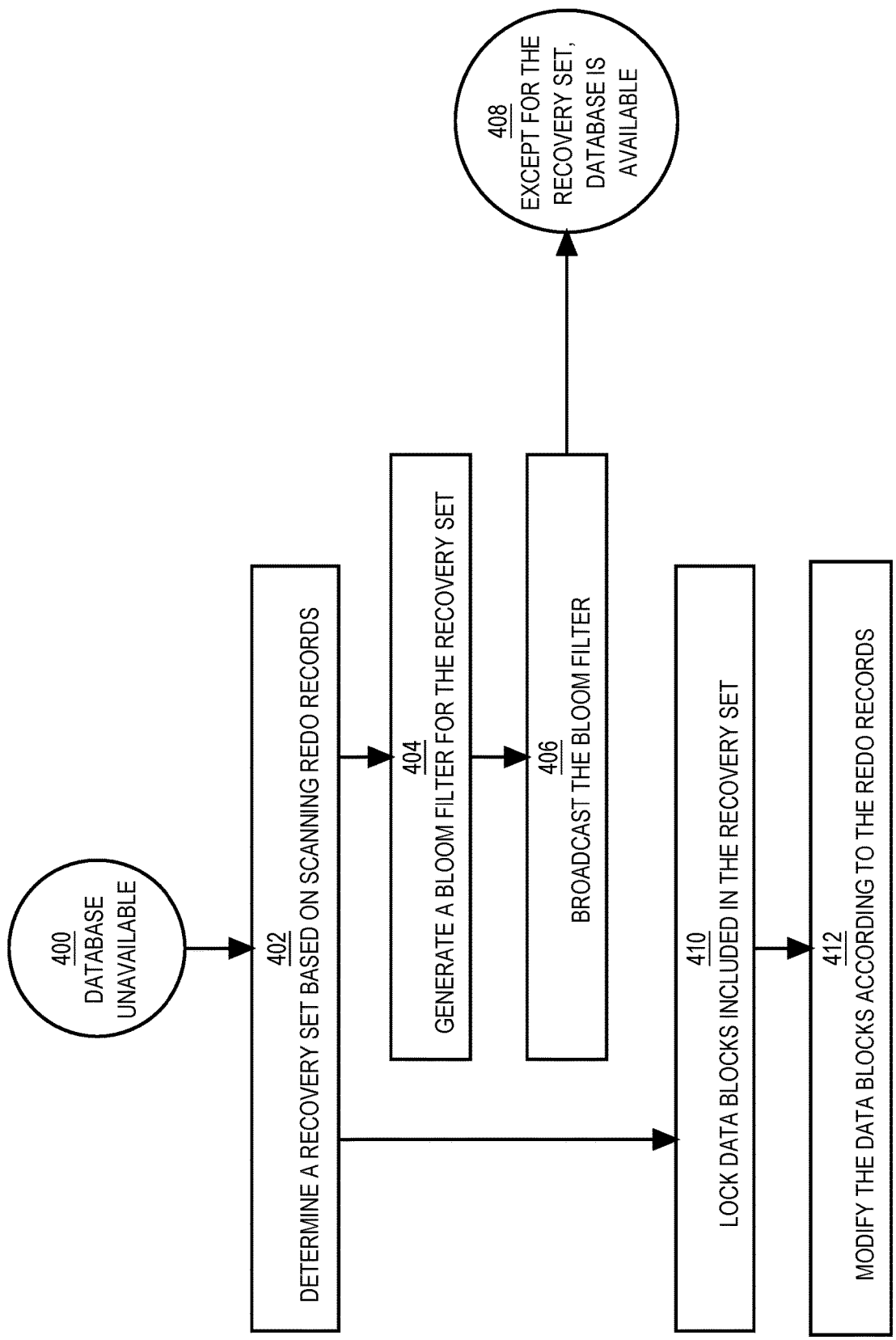
FIG. 4 is a flow diagram that depicts an approach for recovering the cache of a failed database server instance.

FIG. 4 is a flow diagram that depicts an approach for performing cache recovery of a failed instance. The approach of FIG. 4 is performed, at least in part, by an instance recovery process executing on an instance that has survived an instance failure.

In the example of FIG. 4, a database becomes unavailable at state 400. In other words, one or more instances have failed, thereby causing a brown-out. However, in some embodiments, the database may become unavailable after block 402 and/or block 404.

The one or more instances that have failed are part of a multi-node DBMS comprising a plurality of instances. At least one instance of the plurality of instances is designated as a surviving instance that will host the instance recovery process.

At block 402, the scan phase begins. To determine a recovery set, redo records that follow a checkpoint are scanned. The recovery set includes data blocks that have been modified by one or more instances and not persisted.

Scanning involves traversing the redo records, which indicate modifications to the data blocks. In the event of multiple concurrent instance failures, the redo records include multiple sets of redo records that are merged prior to scanning.

For example, set of redo records A may indicate modifications to set of data blocks A made by instance A and not persisted. Set of redo records B may indicate modifications to set of data blocks B made by instance B and not persisted. If instances A and B both fail, instance C may merge set of redo records A and set of redo records B prior to scanning for a recovery set that includes set of data blocks A and set of data blocks B.

At block 404, the scan phase continues with a Bloom filter being generated for the recovery set determined at block 402. The Bloom filter indicates whether data blocks are excluded from the recovery set. In some embodiments, blocks 402 and 404 are performed concurrently.

As mentioned above, the Bloom filter may be generated before or after the one or more instances have failed. If the Bloom filter is generated before the one or more instances have failed, block 404 may proceed to block 402 when one or more data blocks of the recovery set are persisted. Persisting the one or more data blocks causes a checkpoint position to advance, thereby resulting in a different set of data blocks that have been modified and not persisted. This different set of data blocks constitutes a different recovery set, thereby necessitating generation of a different Bloom filter.

At block 406, a surviving instance sends the Bloom filter to one or more other instances. In any embodiment, one or more instance have failed by this point. In some embodiments, if multiple Bloom filters respectively corresponding to multiple instances are generated prior to the multiple instances concurrently failing, then the multiple Bloom filters may be broadcasted.

At state 408, with the exception of the recovery set, the database is available. As will be described in greater detail in FIG. 5, this is because the Bloom filter can be used to determine which data blocks are safe to access.

At block 410, the claim phase involves the surviving instance acquiring locks on the data blocks included in the recovery set. Notably, the Bloom filter is not used to acquire locks. The claim phase may also involve the surviving instance storing copies of the data blocks in memory.

In the conventional approach, the database would have become available after block 410. Thus, Bloom filters enable the database to become available significantly earlier than in the conventional approach.

At block 412, the apply phase involves the surviving instance modifying the data blocks according to modifications indicated in the redo records. After the apply phase, cache recovery is complete, and transaction recovery is performed. After transaction recovery is complete, the data blocks in the recovery set become available to client requests.

Figure 5:
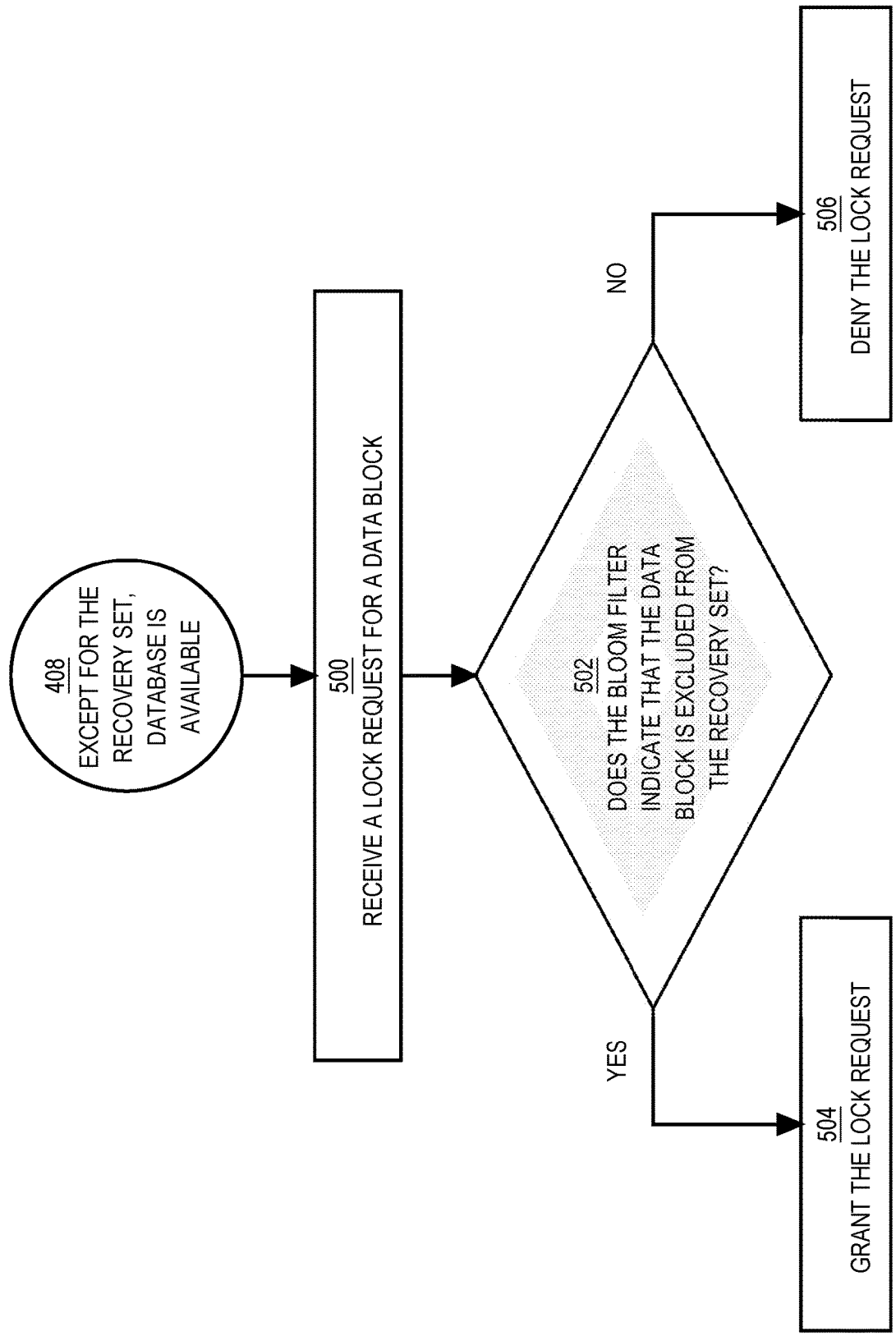
FIG. 5 is a flow diagram that depicts an approach for managing access to data blocks during instance recovery.

FIG. 5 is a flow diagram that depicts an approach for managing database access during instance recovery. The approach of FIG. 5 may be performed by any instance that has survived the instance failure.

At block 500, any instance with the Bloom filter may receive a lock request for a particular data block. The lock request may originate from a client device that desires access to the particular data block.

In some embodiments, block 500 may proceed to block 501 (not shown), where a determination is made as to whether a lock has already been acquired for the particular data block. If a lock has already been acquired, block 501 may proceed to block 506. Otherwise, block 501 may proceed to block 502.

At block 502, a determination is made as to whether the Bloom filter indicates that the particular data block is excluded from the recovery set. For example, a file number and a block number of the particular data block may be hashed, and the corresponding indices may be checked for set bits.

At block 504, the lock request is granted if the Bloom filter indicates that the particular data block is excluded from the recovery set. Thus, the client device may be granted access to the particular data block.

At block 506, the lock request is denied if the Bloom filter fails to indicate that the particular data block is excluded from the recovery set. Thus, the client device may be denied access to the particular data block.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
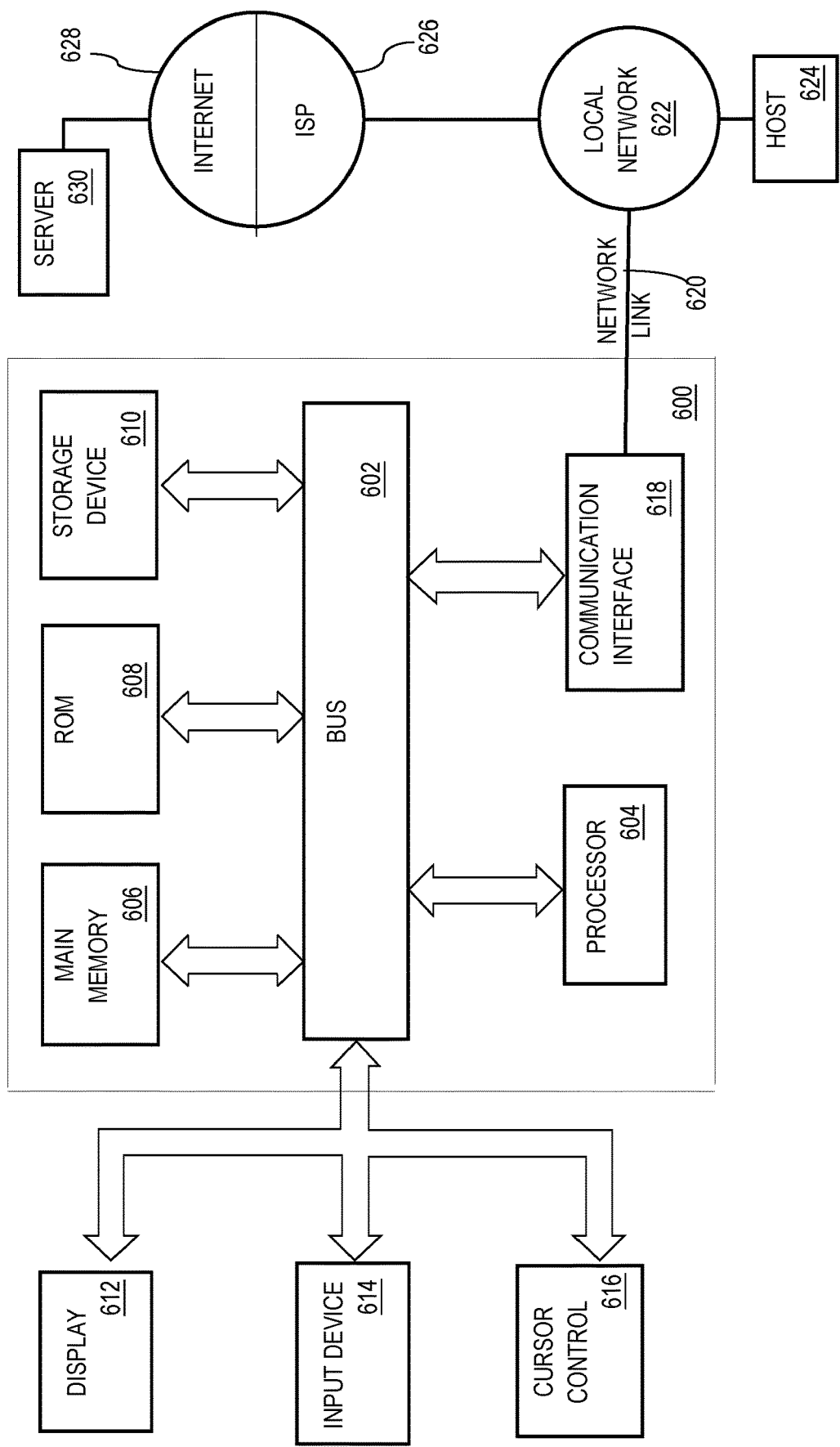
FIG. 6 depicts a computer system upon which an embodiment may be implemented.

For example, FIG. 6 is a block diagram that illustrates a computer system 600 upon which an embodiment of the disclosure may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

Software Overview

Figure 7:
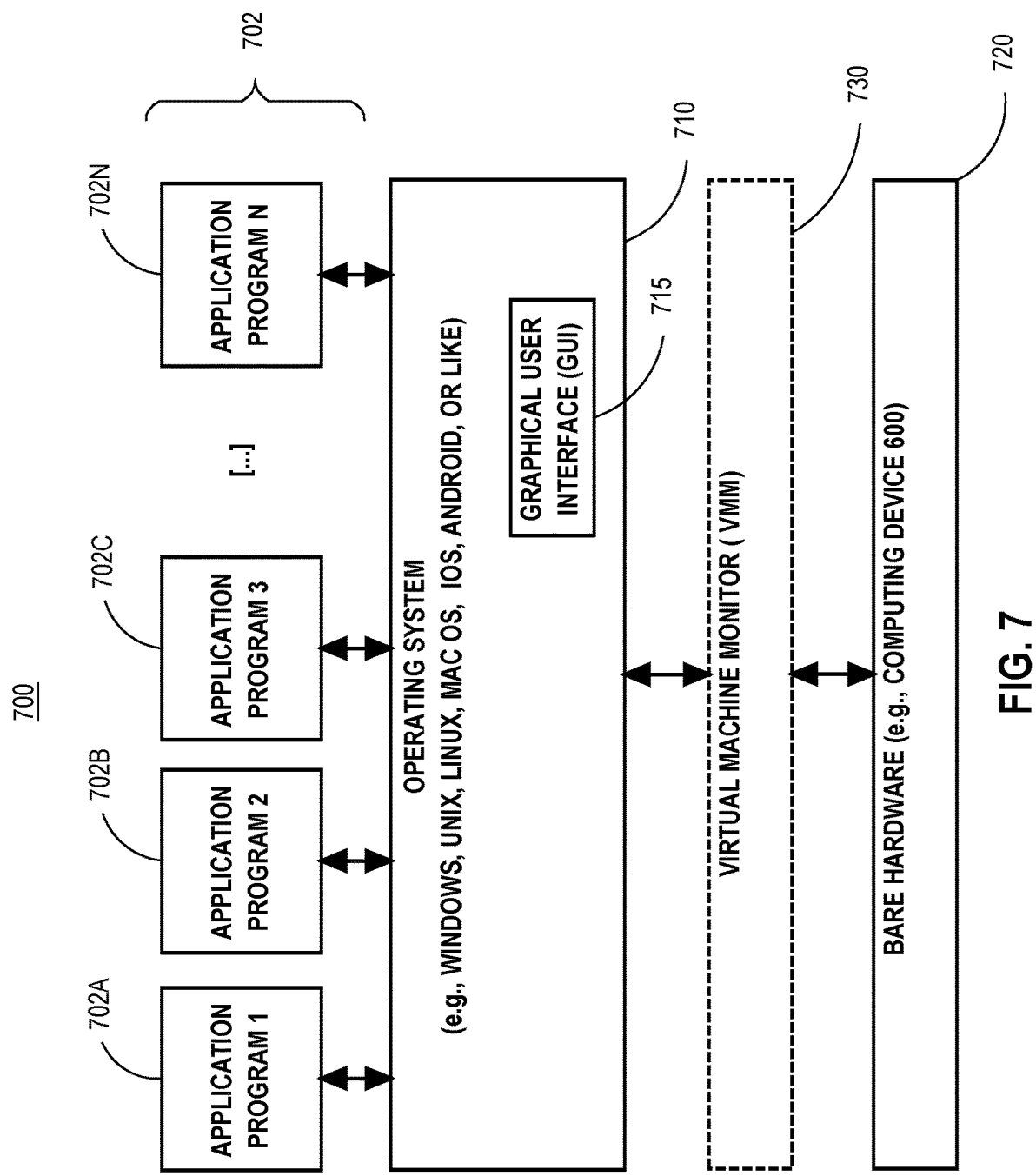
FIG. 7 depicts a software system for controlling the operation of the computer system.

FIG. 7 is a block diagram of a software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 600. The applications or other software intended for use on system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 and applications 702 can execute directly on bare hardware 720 (e.g., system 700). Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

EXTENSIONS AND ALTERNATIVES

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A method comprising:
   including, in a first recovery set, a first set of data blocks of a database that have been modified by a first database server instance and not persisted, wherein a multi-node database management system (DBMS) comprises said first database server instance, said database and a second database server instance;
   generating a first Bloom filter that indicates whether data blocks are excluded from said first recovery set;
   sending said first Bloom filter to said second database server instance;
   locking said first recovery set, wherein locking said first recovery set includes locking each data block in the first recovery set;
   while said locking said first recovery set, and before locking all data blocks in said first recovery set:
      receiving, by said second database server instance, a particular lock request on a particular data block in said database for accessing said particular data block; and
      in response to receiving said particular lock request on said particular data block:
         determining, by said second database server instance, that said first Bloom filter indicates that said particular data block is excluded from said first recovery set, and
         in response to determining that said first Bloom filter indicates that said particular data block is excluded from said first recovery set, granting said particular lock request on said particular data block;
   after locking at least some data blocks in said first recovery set, applying a first set of redo records to said at least some data blocks in said first recovery set.

2. The method of claim 1, wherein including, in said first recovery set, said first set of data blocks comprises:
   traversing a first set of redo records that indicate modifications to said first set of data blocks.

3. The method of claim 2, further comprising:
   after including said first set of data blocks in said first recovery set, modifying said first set of data blocks based on said modifications indicated in said first set of redo records.

4. The method of claim 1, wherein generating the first Bloom filter is performed after an instance failure of said first database server instance.

5. The method of claim 1, wherein generating the first Bloom filter is performed before an instance failure of said first database server instance.

6. The method of claim 1, further comprising, prior to including said first set of data blocks in said first recovery set:
   including, in a second recovery set, a second set of data blocks that have been modified by said first database server instance and not persisted;
   generating a second Bloom filter that indicates whether data blocks are excluded from said second recovery set;
   persisting one or more data blocks of said second set of data blocks.

7. The method of claim 1, wherein said first Bloom filter has a size that is determined based on an amount of volatile memory that is allocated for instance recovery.

8. The method of claim 1, wherein said first Bloom filter has a size that is determined based on an amount of volatile memory that was allocated for a previous instance recovery.

9. The method of claim 1, wherein said first Bloom filter has a user-specified size.

10. The method of claim 1, wherein said first Bloom filter has a user-specified false positive rate.

11. One or more non-transitory storage media storing one or more sequences of instructions which, when executed by one or more computing devices, cause:
    including, in a first recovery set, a first set of data blocks of a database that have been modified by a first database server instance and not persisted, wherein a multi-node database management system (DBMS) comprises said first database server instance, said database and a second database server instance;
    generating a first Bloom filter that indicates whether data blocks are excluded from said first recovery set;
    sending said first Bloom filter to said second database server instance;
    locking said first recovery set, wherein locking said first recovery set includes locking each data block in the first recovery set;
    while said locking said first recovery set, and before locking all data blocks in said first recovery set:
       receiving, by said second database server instance, a particular lock request on a particular data block in said database for accessing said particular data block; and
       in response to receiving said particular lock request on said particular data block:
          determining, by said second database server instance, that said first Bloom filter indicates that said particular data block is excluded from said first recovery set, and
          in response to determining that said first Bloom filter indicates that said particular data block is excluded from said first recovery set, granting said particular lock request on said particular data block;
    after locking at least some data blocks in said first recovery set, applying a first set of redo records to said at least some data blocks in said first recovery set.

12. The one or more non-transitory storage media of claim 11, wherein including, in said first recovery set, said first set of data blocks comprises:
    traversing a first set of redo records that indicate modifications to said first set of data blocks.

13. The one or more non-transitory storage media of claim 12, wherein said one or more sequences of instructions further comprise instructions which, when executed by said one or more computing devices, cause:
    after including said first set of data blocks in said first recovery set, modifying said first set of data blocks based on said modifications indicated in said first set of redo records.

14. The one or more non-transitory storage media of claim 11, wherein generating the first Bloom filter is caused after an instance failure of said first database server instance.

15. The one or more non-transitory storage media of claim 11, generating the first Bloom filter is caused before an instance failure of said first database server instance.

16. The one or more non-transitory storage media of claim 11, wherein said one or more sequences of instructions further comprise instructions which, when executed by said one or more computing devices, cause, prior to causing said first set of data blocks to be included in said first recovery set:

including, in a second recovery set, a second set of data blocks that have been modified by said first database server instance and not persisted;

generating a second Bloom filter that indicates whether data blocks are excluded from said second recovery set;

persisting one or more data blocks of said second set of data blocks.

17. The one or more non-transitory storage media of claim 11, wherein said first Bloom filter has a size that is determined based on an amount of volatile memory that is allocated for instance recovery.

18. The one or more non-transitory storage media of claim 11, wherein said first Bloom filter has a size that is determined based on an amount of volatile memory that was allocated for a previous instance recovery.

19. The one or more non-transitory storage media of claim 11, wherein said first Bloom filter has a user-specified size.

20. The one or more non-transitory storage media of claim 11, wherein said first Bloom filter has a user-specified false positive rate.

* * * * *